US010215156B2

(12) United States Patent
Caffrey et al.

(10) Patent No.: US 10,215,156 B2
(45) Date of Patent: Feb. 26, 2019

(54) AUTONOMOUS YAW CONTROL FOR A WIND TURBINE

(71) Applicant: General Electric Company, Schenectady, NY (US)

(72) Inventors: Paul Oliver Caffrey, Roanoke, VA (US); Timothy Botsford Cribbs, Roanoke, VA (US); Christopher Lee Tschappatt, Roanoke, VA (US); William Borea Noto, Niskayuna, NY (US); Joerg Middendorf, Holdorf (DE)

(73) Assignee: General Electric Company, Schenectady, NY (US)

( * ) Notice: Subject to any disclaimer, the term of this patent is extended or adjusted under 35 U.S.C. 154(b) by 684 days.

(21) Appl. No.: 14/702,997

(22) Filed: May 4, 2015

(65) Prior Publication Data

US 2016/0327023 A1 Nov. 10, 2016

(51) Int. Cl.
*F03D 7/02* (2006.01)
*F03D 15/10* (2016.01)
(Continued)

(52) U.S. Cl.
CPC ............ *F03D 7/022* (2013.01); *F03D 7/0204* (2013.01); *F03D 7/047* (2013.01); *F03D 9/25* (2016.05);
(Continued)

(58) Field of Classification Search
CPC ........ F03D 9/25; F03D 7/0212; F03D 7/0204; F03D 7/022; F03D 7/0208; F03D 7/042;
(Continued)

(56) References Cited

U.S. PATENT DOCUMENTS 5,035,575 A 7/1991 Nielsen et al.
5,278,773 A 1/1994 Cousineau
(Continued)

FOREIGN PATENT DOCUMENTS

CA 2833974 A1 5/2014
CN 201708766 U 1/2011
(Continued)

OTHER PUBLICATIONS

European Search Report and Opinion issued in connection with corresponding EP Application No. 16168168.9 dated Sep. 30, 2016.

*Primary Examiner* — Richard A Edgar
*Assistant Examiner* — Danielle M. Christensen
(74) *Attorney, Agent, or Firm* — Dority & Manning, P.A.

(57) ABSTRACT

The present disclosure is directed to a system and method for autonomous yaw control of a wind turbine. The method includes measuring, via a wind sensor, one or more wind conditions near the wind turbine. Another step includes receiving, via a distributed inputs and outputs (I/O) module, the one or more wind conditions from the wind sensor. The method also includes determining, via the distributed I/O module, a control signal for a yaw drive mechanism of the wind turbine as a function of the one or more wind conditions. Further, the yaw drive mechanism is configured to modify an orientation of a nacelle of the wind turbine. Thus, the method also includes controlling, via the distributed I/O module, the yaw drive mechanism based on the control signal.

16 Claims, 4 Drawing Sheets

(51) Int. Cl.
　　　*F03D 80/70*　　(2016.01)
　　　*F03D 7/04*　　(2006.01)
　　　*H02K 7/18*　　(2006.01)
　　　*F03D 9/25*　　(2016.01)
　　　*F03D 80/80*　　(2016.01)

(52) U.S. Cl.
　　　CPC ............. *F03D 15/10* (2016.05); *F03D 80/70* (2016.05); *H02K 7/1838* (2013.01); *F03D 80/88* (2016.05); *F05B 2270/1074* (2013.01); *F05B 2270/329* (2013.01); *Y02E 10/723* (2013.01)

(58) Field of Classification Search
　　　CPC .... F03D 7/047; F03D 7/04; F05B 2270/1074; F05B 2270/329; H02K 7/1838
　　　See application file for complete search history.

(56) References Cited

U.S. PATENT DOCUMENTS

| | | | |
|---|---|---|---|
| 6,265,785 B1 | 7/2001 | Cousineau et al. | |
| 6,927,502 B2 | 8/2005 | Wobben | |
| 6,945,752 B1 | 9/2005 | Wobben | |
| 7,218,012 B1 | 5/2007 | Edenfeld | |
| 7,288,851 B2 | 10/2007 | Wobben | |
| 7,394,166 B2 | 7/2008 | Teichmann et al. | |
| 7,436,083 B2 * | 10/2008 | Shibata | F03D 7/0204 290/44 |
| 7,602,074 B2 | 10/2009 | Voss | |
| 7,944,070 B2 | 5/2011 | Rosenvard et al. | |
| 8,154,142 B2 | 4/2012 | Nies | |
| 8,178,989 B2 | 5/2012 | Haag et al. | |
| 9,564,756 B2 * | 2/2017 | Della Sera | H02J 3/38 |
| 2009/0051222 A1 | 2/2009 | Schellings | |
| 2011/0318178 A1 | 12/2011 | Andersen | |
| 2012/0136630 A1 | 5/2012 | Murphy et al. | |
| 2012/0165985 A1 | 6/2012 | Xia et al. | |
| 2012/0242085 A1 | 9/2012 | Garfinkel et al. | |
| 2013/0241202 A1 | 9/2013 | Thisted et al. | |
| 2014/0145439 A1 | 5/2014 | Burra et al. | |
| 2015/0233351 A1 * | 8/2015 | Rickeshenrich | F03D 7/0224 416/1 |

FOREIGN PATENT DOCUMENTS

| | | |
|---|---|---|
| CN | 101963131 A | 2/2011 |
| CN | 202031771 U | 11/2011 |
| CN | 202108661 U | 1/2012 |
| CN | 202165217 U | 3/2012 |
| CN | 101839214 B | 5/2012 |
| CN | 202250602 U | 5/2012 |
| CN | 202268707 U | 6/2012 |
| CN | 102777319 A | 11/2012 |
| CN | 202756175 U | 2/2013 |
| CN | 102359434 B | 7/2013 |
| CN | 102011698 B | 9/2013 |
| CN | 103321840 A | 9/2013 |
| DE | 102004051843 A1 | 4/2006 |
| EP | 1906192 A2 | 4/2008 |
| EP | 2642120 A1 | 9/2013 |
| EP | 2670978 A2 | 12/2013 |
| IN | 201300650 P2 | 7/2013 |
| KR | 20130024108 A | 3/2013 |
| WO | 2010031575 A2 | 3/2010 |
| WO | 2013110272 A1 | 8/2013 |
| WO | WO 2013143545 A1 * 10/2013 ............. F03D 7/047 |
| WO | 2014071947 A1 | 5/2014 |

* cited by examiner

AUTONOMOUS YAW CONTROL FOR A WIND TURBINE

FIELD OF THE INVENTION

The present disclosure relates in general to wind turbine, and more particularly to autonomous yaw control for wind turbines.

BACKGROUND OF THE INVENTION

Wind power is considered one of the cleanest, most environmentally friendly energy sources presently available, and wind turbines have gained increased attention in this regard. A modern wind turbine typically includes a nacelle fixed atop a tower, a generator and a gearbox housed with the nacelle, and a rotor configured with the nacelle having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

At least some known nacelles include a yaw system for controlling a perspective of the rotor relative to a direction of wind. Such wind turbines also include sensors for sensing a direction of the wind. Thus, the wind turbine controller is configured to adjust the yaw of the wind turbine via the yaw system based on the sensed wind direction.

If the wind turbine controller is offline, however, then there is no way to operate the yaw system. Without the yaw system, the wind turbine may be subjected to increased loads (e.g., asymmetric loads) that result from yaw misalignment which may contribute to significant fatigue cycles on the wind turbine components. As the wind turbine components become worn, the wind turbine becomes less effective.

Thus, there is a need for a new and improved system and method for wind turbine yaw control that addresses the aforementioned issues. More specifically, an autonomous system and method for controlling the yaw of the wind turbine that does not rely of the main controller of the wind turbine would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for autonomous yaw control of a wind turbine. The method includes measuring, via a wind sensor, one or more wind conditions, e.g. wind speed or wind direction, near the wind turbine. Another step includes receiving, via a distributed inputs and outputs (I/O) module, the one or more wind conditions from the wind sensor. The method also includes determining, via the distributed I/O module, a control signal for a yaw drive mechanism of the wind turbine as a function of the one or more wind conditions. Further, the yaw drive mechanism is configured to modify an orientation of a nacelle of the wind turbine. Thus, the method also includes controlling, via the distributed I/O module, the yaw drive mechanism based on the control signal.

In one embodiment, the distributed I/O module is part of a wind turbine distributed control system. In another embodiment, the method may also include storing, via a memory store, a yaw control scheme within the distributed I/O module. In additional embodiments, the wind turbine distributed control system may also include one or more interlocks configured to protect the distributed I/O module. In yet another embodiment, the method may also include receiving, via the distributed I/O module, a signal from a main turbine controller of the wind turbine distributed control system indicating that the main turbine controller is offline.

In certain embodiments, the distributed I/O module may include a top box distributed I/O module of the wind turbine distributed control system. In further embodiments, the distributed I/O module may include any other suitable I/O module in an existing wind turbine control system.

In further embodiments, the yaw drive mechanism may include a yaw drive motor, a yaw drive pinion, and a yaw bearing operatively coupled with the yaw drive pinion, with the yaw bearing being configured between the nacelle and a tower of the wind turbine. More specifically, in certain embodiments, the yaw drive mechanism may also include a yaw drive gearbox operatively coupled to the yaw drive motor and the yaw drive pinion, wherein the yaw drive pinion is in rotational engagement with the yaw bearing. Thus, in particular embodiments, the step of controlling the yaw drive mechanism based on the control signal may include sending the control signal to the yaw drive motor such that the yaw drive motor imparts mechanical force to the yaw drive gearbox and the yaw drive gearbox drives the yaw drive pinion so as to rotate the yaw bearing and consequently, the nacelle about a yaw axis.

In additional embodiments, the wind sensor may be any suitable wind sensor, including but not limited to a Light Detection and Ranging (LIDAR) device, a Sonic Detection and Ranging (SODAR) device, an anemometer, a wind vane, a barometer, a radar device, or any other sensing device which can provide wind directional information now known or later developed in the art.

In another aspect, the present disclosure is directed to a method for operating a wind turbine when a main controller of the wind turbine is offline. The method includes programming a distributed inputs and outputs (I/O) module with a control scheme for one or more wind turbine components. Another step includes measuring, via a wind sensor, one or more wind conditions near the wind turbine. The method also includes determining, via control scheme, a control signal for the one or more wind turbine components as a function of the one or more wind conditions. Thus, the method also includes controlling, via the distributed I/O module, the one or more wind turbine components based on the control signal. It should be understood that the method may also include any of the additional features and/or steps as described herein.

In yet another aspect, the present disclosure is directed to a distributed control system for autonomous yaw control of a wind turbine. The system may include a wind sensor configured to measure one or more wind conditions near the wind turbine, a main turbine controller, and at least one distributed control module communicatively coupled with the main turbine controller and the wind sensor. Further, the distributed control module is configured to perform one or more operations, including but not limited to receiving the one or more wind conditions from the wind sensor, determining a control signal for a yaw drive mechanism of the wind turbine, wherein the yaw drive mechanism is configured to modify an orientation of a nacelle of the wind turbine, and controlling the yaw drive mechanism based on the control signal.

In one embodiment, the distributed control module is part of a wind turbine distributed control system. More specifically, in certain embodiments, the distributed control module includes at least one of a top box distributed I/O module or an independent safety controller of the distributed control system. It should be understood that the system may also include any of the features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
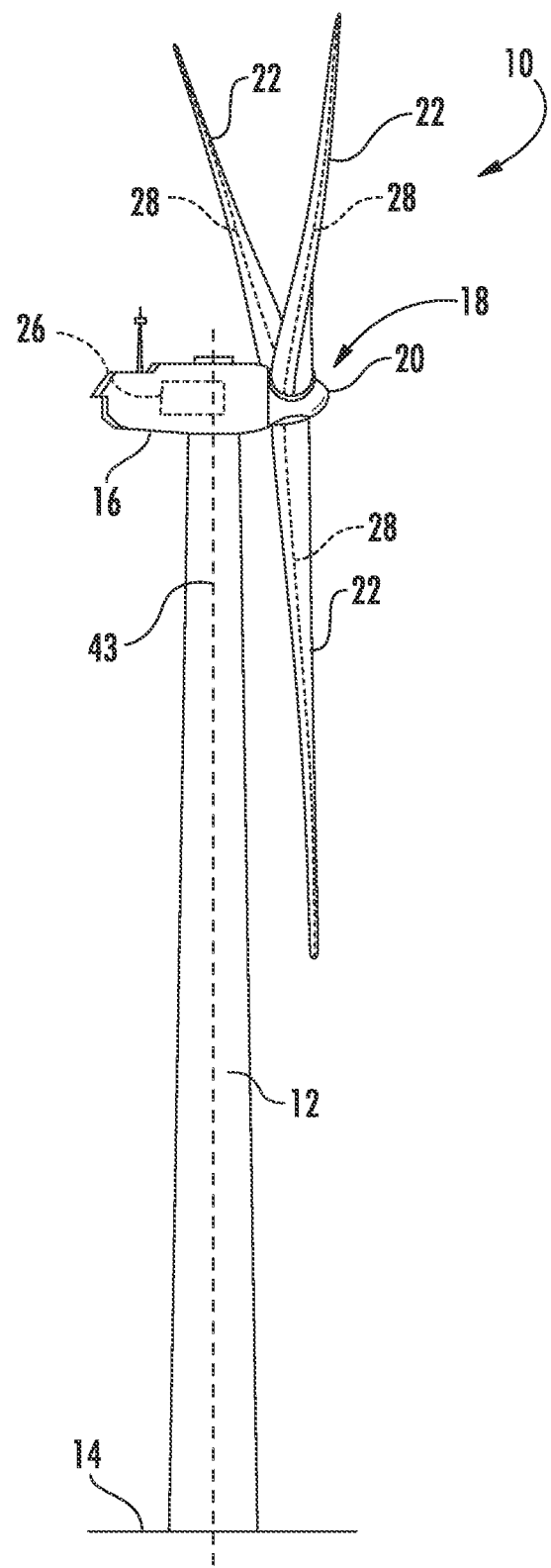
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for autonomous yaw control of a wind turbine. A typical wind turbine controller includes a distributed control system having a plurality of distributed input and output (I/O) modules distributed throughout the turbine for control of the individual wind turbine components. In such a system, the main controller is generally required to receive all of the I/O from each of the modules before coming online. Thus, the controller will continue to wait for all required inputs, during which time, the main controller is unable to control the turbine. In this waiting state, the wind turbine may experience high loading and/or vibrations. As such, the system and method of the present disclosure provides a distributed inputs and outputs (I/O) module module having a preprogrammed control scheme stored therein that is configured to control various wind turbine components when the main controller is offline. More specifically, in certain embodiments, the distributed I/O module receives one or more wind conditions and determines a control signal for a yaw drive mechanism of the wind turbine as a function of the one or more wind conditions. The distributed I/O module then autonomously controls the yaw drive mechanism based on the control signal.

The present disclosure provides many advantages not present in the prior art. For example, if the main controller fails to receive certain inputs or outputs, then the distributed I/O module is configured to yaw the nacelle to protect the wind turbine from excessive loading. As such, tower stresses of the wind turbine are reduced, thereby increasing the tower life. In additional, the present disclosure is configured to utilize existing hardware and is therefore relatively inexpensive to implement.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
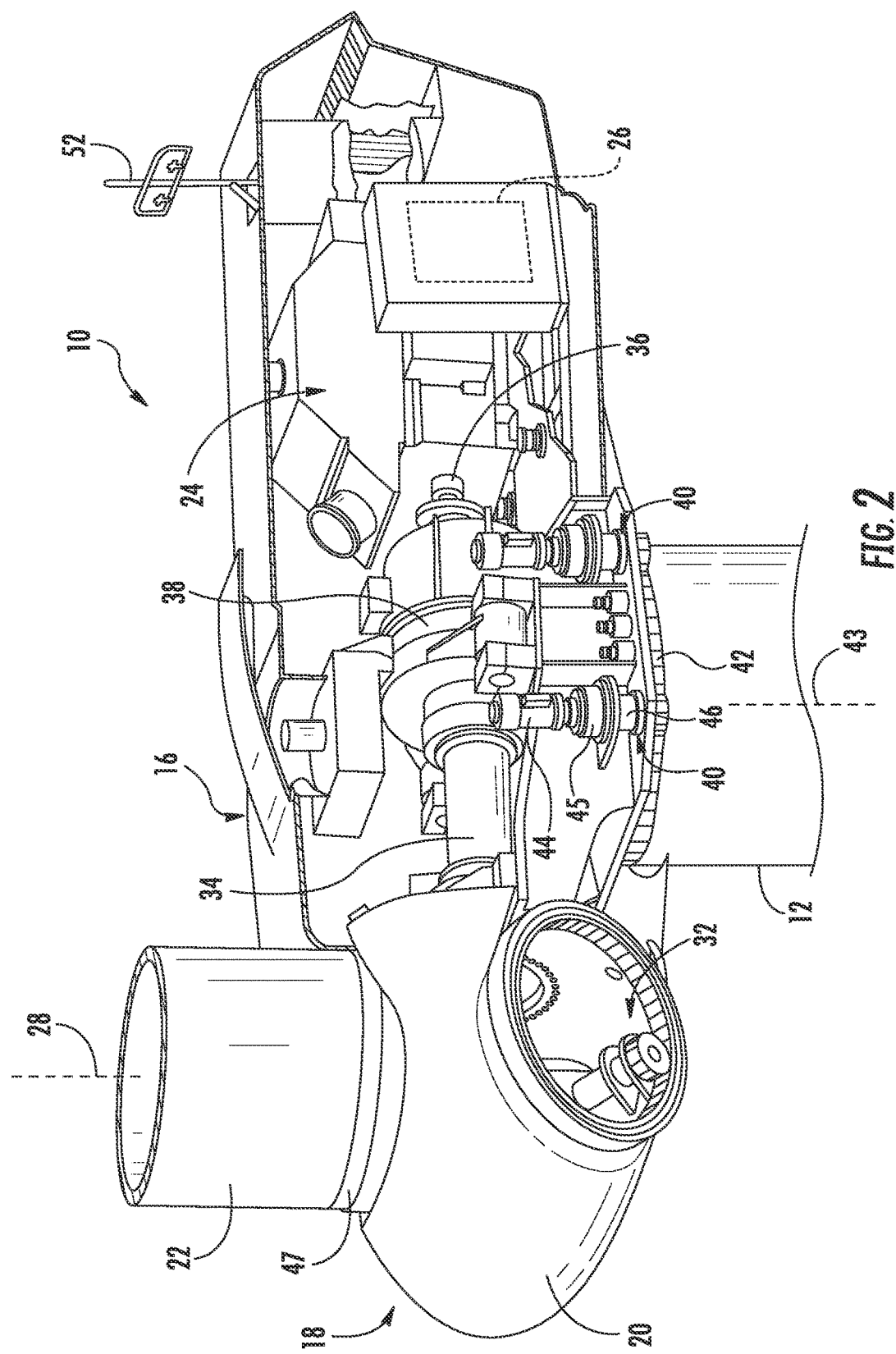
FIG. 2 illustrates a simplified, internal view of one embodiment of a nacelle according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may include a yaw drive mechanism 40 configured to change the angle of the nacelle 16 relative to the wind (e.g., by engaging a yaw bearing 43 of the wind turbine 10). Further, each yaw drive mechanism 40 may include a yaw drive motor 44 (e.g., any suitable electric motor), a yaw drive gearbox 45, and a yaw drive pinion 46. In such embodiments, the yaw drive motor 44 may be coupled to the yaw drive gearbox 45 so that the yaw drive motor 44 imparts mechanical force to the yaw drive gearbox 45. Similarly, the yaw drive gearbox 45 may be coupled to the yaw drive pinion 46 for rotation therewith. The yaw drive pinion 46 may, in turn, be in rotational engagement with a yaw bearing 42 coupled between the tower 12 and the nacelle 16 such that rotation of the yaw drive pinion 46 causes rotation of the yaw bearing 42. Thus, in such embodiments, rotation of the yaw drive motor 44 drives the yaw drive gearbox 45 and the yaw drive pinion 46, thereby rotating the yaw bearing 42 and the nacelle 16 about the yaw axis 43. Similarly, the wind turbine 10 may include one or more pitch adjustment mechanisms 32 communicatively coupled to the wind turbine controller 26, with each pitch adjustment mechanism(s) 32 being configured to rotate the pitch bearing 47 and thus the individual rotor blade(s) 22 about the pitch axis 28.

In addition, the wind turbine 10 may also include one or more sensors 52 for monitoring various wind conditions of the wind turbine 10. For example, as shown in FIG. 2, the wind direction, wind speed, or any other suitable wind condition near of the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art.

As mentioned, a typical wind turbine controller includes a distributed control system having a main controller and a plurality of distributed input and output (I/O) modules distributed throughout the turbine for control of the individual wind turbine components. Thus, for conventional wind turbines, the main controller is required to receive all of the I/O from each of the modules before coming online. The controller will continue to wait for all required inputs, during which time, the controller is unable to control the turbine, thereby causing excessive loading and/or vibrations. In still other situations, the main controller can be inaccessible or otherwise unavailable, for example, due to a power outage and/or scheduled maintenance. As such, the present disclosure is directed to systems and methods that addresses the aforementioned issues.

Figure 3:
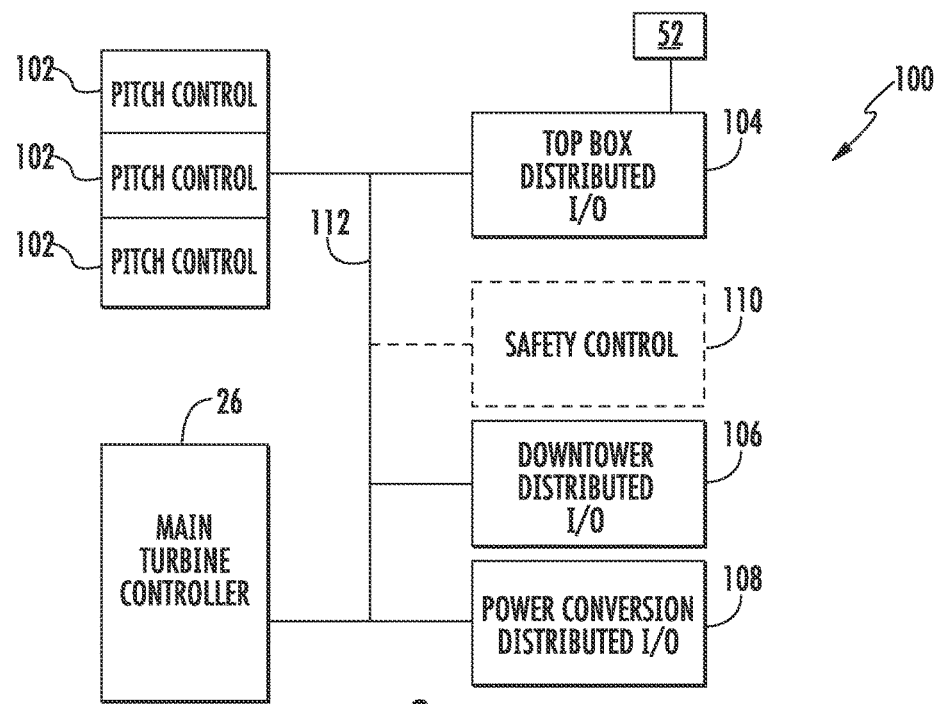
FIG. 3 illustrates a schematic diagram of one embodiment of a distributed control system according to the present disclosure.

For example, as shown in FIG. 3, a distributed control system 100 for a wind turbine, such as wind turbine 10 of FIG. 1, according to example embodiments of the disclosure is illustrated. As shown, the control system 100 includes the main wind turbine controller 26 and a plurality of distributed input and output (I/O) modules 104, 106, 108 for individual control of one or more wind turbine components. More specifically, as shown in the illustrated embodiment, the control system 100 includes a top box distributed I/O 104, a downtower distributed I/O 106, and a power conversion distributed I/O 108. Further, as shown, each of the distributed I/O modules 104, 106, 108 are connected to the main turbine controller 26 via a communications networks 112 for command and monitoring. It should be understood that the communications network 112 as described herein may include any suitable communication medium for transmitting the signals. For instance, the communications network 112 may include any number of wired or wireless links, including communication via one or more Ethernet connections, fiber optic connections, network buses, power lines, conductors, or circuits for transmitting information wirelessly. Further, signals may be communicated over the communications network 112 using any suitable communication protocol, such as a serial communication protocol, broadband over power line protocol, wireless communication protocol, or other suitable protocol.

Thus, the turbine controller 26 is configured to receive information from the input modules and send information to output modules. The inputs and outputs can be either analog signals which are continuously changing or discrete signals. More specifically, in certain embodiments, the top box distributed I/O 104 is configured to provide I/O to the turbine controller 26 so as to control uptower components of the wind turbine 10, e.g. the yaw drive mechanism 40. Similarly, the downtower distributed I/O 106 is configured to provide I/O to the turbine controller 26 so as to control the downtower electrical assembly, e.g. transformers, etc. The power conversion distributed I/O 108 is configured to provide I/O to the turbine controller 26 so as to control the power converter of the wind turbine 10. In addition, the control system 100 may optionally include one or more independent safety controllers 110 configured to protect the various components of the control system 100. In still additional embodiments, the control system 100 may include more or less distributed I/O modules than those depicted in FIG. 3 depending on the specific components of the wind turbine 10.

The control system 100 also includes one or more pitch control systems 102 configured to control the pitch angle of the rotor blades 22. For example, as shown, the control system 100 includes three pitch control systems 102, i.e. one for each of the three rotor blades 22 of the wind turbine 10 of FIG. 1. As such, in additional embodiments, the control system 100 may also have more than three or less than three pitch control systems 102.

During normal operation, the main controller 26 typically waits to receive all of the I/O from each of the modules 104, 106, 108 before coming online. However, a benefit of the present disclosure is that, if the controller 26 fails to come online, one or more of the modules 104, 106, 108 of the control system 100 may be configured to operate autonomously so as to protect to the wind turbine 10 from increased stresses or loading.

Figure 4:
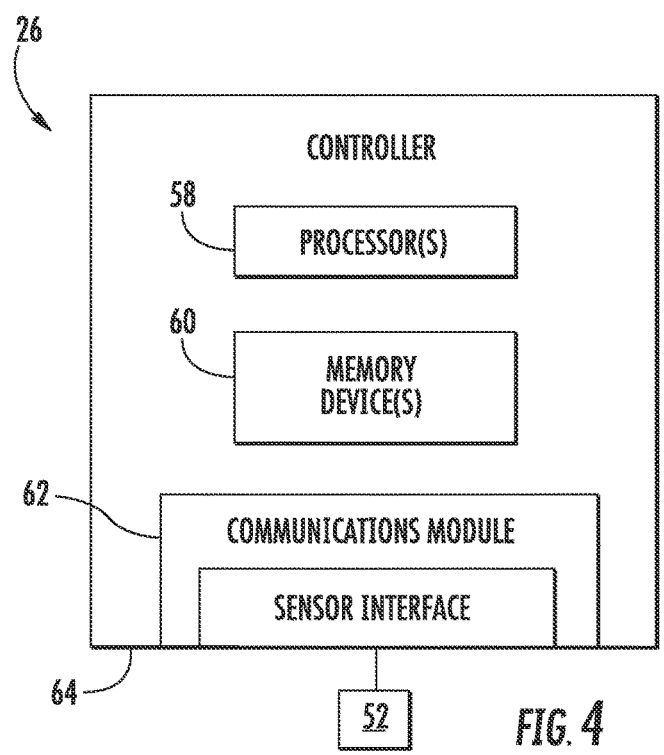
FIG. 4 illustrates a block diagram of one embodiment of a distributed control module according to the present disclosure.

For example, in certain embodiments, one or more of the modules 104, 106, 108 of the control system 100 may include a computer or other suitable processing unit that may include suitable computer-readable instructions that, when implemented, configure the modules 104, 106, 108 to perform various different functions, such as receiving, transmitting and/or executing wind turbine control signals. More specifically, as shown in FIG. 4, there is illustrated a block diagram of one embodiment of suitable components that may be included within the modules 104, 106, 108 (or the turbine controller 26) in accordance with example aspects of the present disclosure. As shown, the modules 104, 106, 108 may include one or more processor(s) 58 and associated memory device(s) 60 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the modules 104, 106, 108 to perform various functions as described herein. Additionally, the modules 104, 106, 108 may also include a communications interface 62 to facilitate communications between the modules 104, 106, 108 and the various components of the wind turbine 10. An interface can include one or more circuits, terminals, pins, contacts, conductors, or other components for sending and receiving control signals. Moreover, the modules 104, 106, 108 may include a sensor interface 64 (e.g., one or more analog-to-digital converters) to permit signals transmitted from the sensors to be converted into signals that can be understood and processed by the processors 58.

Thus, in certain embodiments, the top box distributed I/O 104 can use different computer-readable instructions stored in a different language or protocol relative to the turbine controller 26. In this way, the top box distributed I/O 104 can be a standalone and separate device from the turbine controller 26. Thus, in certain embodiments, the top box distributed I/O 104 (which already receives signals from the anemometer 52) may include a control scheme or algorithm for controlling one or more wind turbine components, e.g. the yaw drive mechanism 40 of the wind turbine 10. Accordingly, in certain embodiments, the control scheme of the top box distributed I/O 104, when implemented thereby, is configured to provide autonomous yaw control of the wind turbine 10 regardless of whether the main controller 26 is online.

Figure 5:
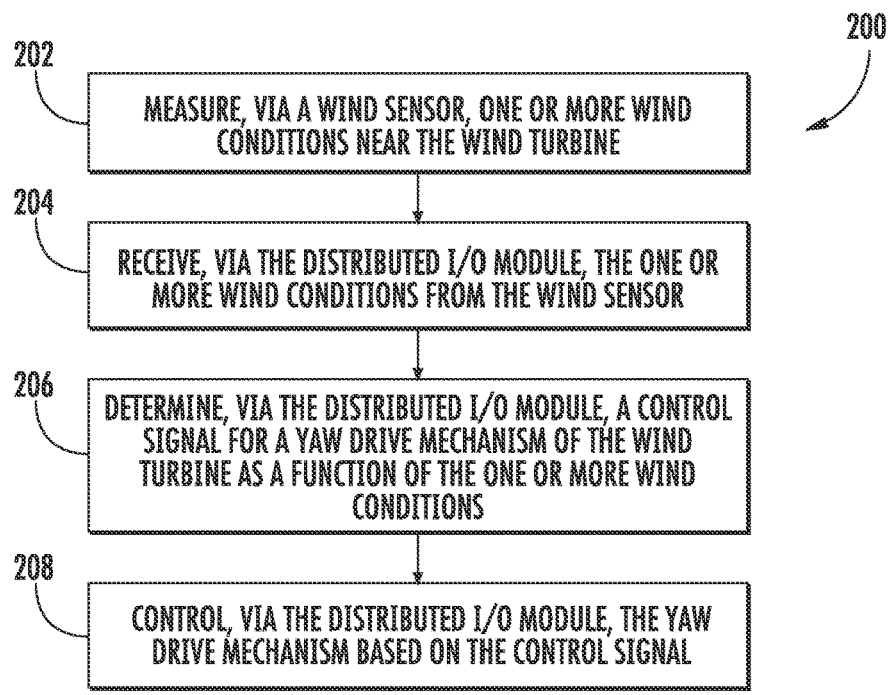
FIG. 5 illustrates a flow diagram of one embodiment of a method for autonomous yaw control of a wind turbine according to the present disclosure.

Referring now to FIG. 5, a flow diagram of an example method (200) for controlling a wind turbine according to example embodiments of the present disclosure. The method (200) can be implemented using one or more control devices, such as one or more of the modules 104, 106, 108 or the separate safety controller 110 depicted in FIG. 3. In addition, FIG. 5 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

As shown at (202), the method 200 includes measuring, via a wind sensor, one or more wind conditions near the wind turbine. At (204), the method 200 includes receiving, via the distributed I/O module 104, the one or more wind conditions from the wind sensor. As mentioned, the distributed I/O module 104 includes one or more preprogrammed yaw control schemes or logics stored in the memory device 60. As such, at (206), the method 200 includes determining a control signal for the yaw drive mechanism 40 of the wind turbine 10 as a function of the one or more wind conditions via the control scheme. Thus, at (208), the method 200 includes controlling, via the distributed I/O module, the yaw drive mechanism 40 based on the control signal. More specifically, in certain embodiments, the step of controlling the yaw drive mechanism 40 based on the control signal may include sending the control signal to the yaw drive motor 44 such that the yaw drive motor 44 imparts a mechanical force to the yaw drive gearbox 45 and the yaw drive gearbox 45 drives the yaw drive pinion 47 so as to rotate the yaw bearing 42 and consequently, the nacelle 16, about the yaw axis 43.

In additional embodiments, the distributed control system 100 may also include one or more interlocks configured to protect the modules 104, 106, 108, particularly the top box distributed module 104. For example, in certain embodiments, the interlock(s) is configured to prevent the top box distributed module 104 from controlling the yaw drive mechanism 40 in a way that would cause damage to the turbine 10. In additional embodiments, the distributed I/O module 104 may remain in a standard operating mode unless or until the module 104 receives a signal from the turbine controller 26 indicating that the controller 26 is offline.

Figure 6:
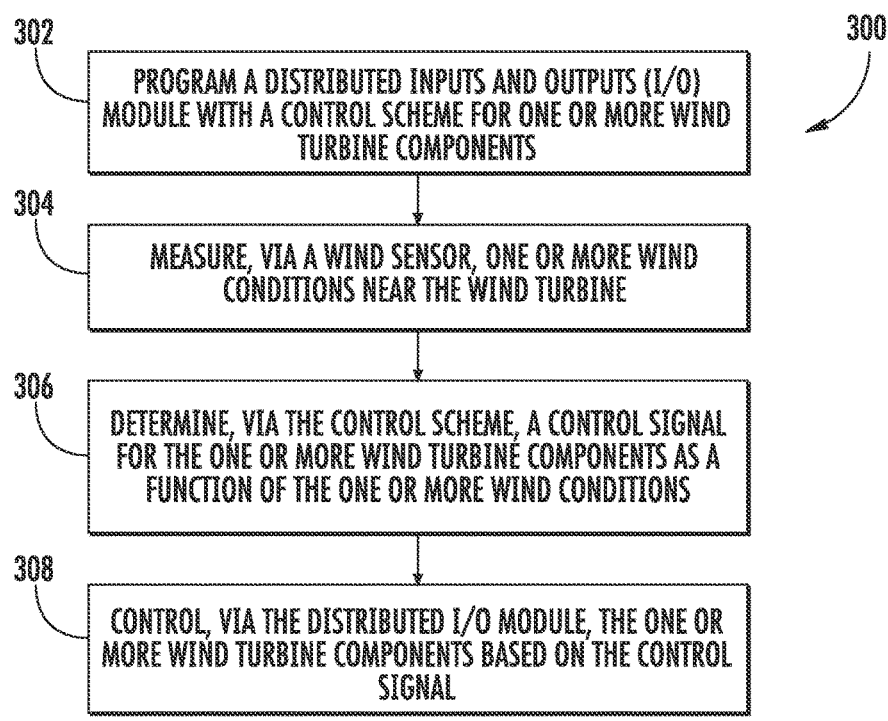
FIG. 6 illustrates a flow diagram of one embodiment of a method for operating a wind turbine when a main controller of the wind turbine is offline according to the present disclosure.

The present disclosure as described herein references autonomous yaw control of a wind turbine, however, it should be understood that the control scheme of the present disclosure may also be applied to control various other wind turbine components in addition the yaw drive mechanism. For example, as shown in FIG. 6, a flow diagram of a method 300 for operating a wind turbine when a main controller of the wind turbine is offline is illustrated. As shown at 302, the method 300 includes programming a distributed inputs and outputs (I/O) module with a control scheme for one or more wind turbine components. At 304, the method 300 includes measuring, via a wind sensor, one or more wind conditions near the wind turbine. At 306, the method 300 includes also includes determining, via control scheme, a control signal for the one or more wind turbine components as a function of the one or more wind conditions. Thus, at 308, the method 300 includes controlling, via the distributed I/O module, the one or more wind turbine components based on the control signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for autonomous yaw control of a wind turbine,
the wind turbine comprising a wind turbine distributed control system having a main turbine controller and a plurality of distributed inputs and outputs (I/O) modules, the plurality of I/O modules comprising, at least, a yaw distributed I/O module, the method comprising:
measuring, via a wind sensor, one or more wind conditions near the wind turbine;

receiving, via the yaw distributed I/O module, the one or more wind conditions from the wind sensor;

monitoring, via the main turbine controller, for availability of the plurality of distributed I/O modules, wherein all of the plurality of distributed I/O modules must become available before the main turbine controller will come online;

receiving, via the yaw distributed I/O module, an offline signal from main turbine controller indicating that the main turbine controller is offline due to failure of all of the plurality of distributed I/O modules to become available;

after receiving the offline signal from the main turbine controller indicating that the main turbine controller is offline due to failure of all of the plurality of districted I/O modules to become available, determining, via the yaw distributed I/O module, a control signal for a yaw drive mechanism of the wind turbine as a function of the one or more wind conditions, the yaw drive mechanism configured to modify an orientation of a nacelle of the wind turbine; and, controlling, via the yaw distributed I/O module, the yaw drive mechanism based on the control signal for as long as the main turbine controller remains offline.

2. The method of claim 1, further comprising storing, via a memory store, a yaw control scheme within the distributed I/O module.

3. The method of claim 2, wherein the wind turbine distributed control system further comprises one or more interlocks configured to protect the distributed I/O module.

4. The method of claim 1, wherein the distributed I/O module comprises a top box distributed I/O module of the wind turbine distributed control system.

5. The method of claim 1, wherein the yaw drive mechanism comprises a yaw drive motor, a yaw drive pinion, and a yaw bearing operatively coupled with the yaw drive pinion, the yaw bearing configured between the nacelle and a tower of the wind turbine.

6. The method of claim 5, wherein the yaw drive mechanism further comprises a yaw drive gearbox operatively coupled to the yaw drive motor and the yaw drive pinion, and wherein the yaw drive pinion is in rotational engagement with the yaw bearing.

7. The method of claim 6, wherein controlling the yaw drive mechanism based on the control signal further comprises sending the control signal to the yaw drive motor such that the yaw drive motor imparts mechanical force to the yaw drive gearbox and the yaw drive gearbox drives the yaw drive pinion so as to rotate the yaw bearing and consequently, the nacelle about a yaw axis.

8. The method of claim 1, wherein the wind sensor further comprises at least one of a Light Detection and Ranging (LIDAR) device, a Sonic Detection and Ranging (SODAR) device, an anemometer, a wind vane, a barometer, or a radar device.

9. A distributed control system for autonomous yaw control of a wind turbine, the system comprising:

a wind sensor configured to measure one or more wind conditions near the wind turbine;

a wind turbine distributed control system comprising a main turbine controller and a plurality of distributed inputs and outputs (I/O) modules, the plurality of distributed I/O modules comprising at least one yaw distributed I/O module communicatively coupled with the main turbine controller and the wind sensor, the main turbine controller configured to monitor for availability of the plurality of distributed I/O modules, wherein all of the plurality of distributed I/O modules must become available before the main turbine controller will come online, wherein the distributed control module is configured to perform one or more operations, the one or more operations comprising:

receiving the one or more wind conditions from the wind sensor, receiving an offline signal from the main turbine controller indicating that the main turbine controller is offline due to failure of all of the plurality of distributed I/O modules to become available;

after receiving the offline signal from the main turbine controller indicating that the main turbine controller is offline due to failure of all of the plurality of districted I/O modules to become available, determining a control signal for a yaw drive mechanism of the wind turbine, the yaw drive mechanism configured to modify an orientation of a nacelle of the wind turbine, and controlling the yaw drive mechanism based on the control signal for as long as the main turbine controller remains offline.

10. The system of claim 9, wherein the distributed control module comprises at least one of a top box distributed I/O module or an independent safety controller.

11. The system of claim 10, wherein the distributed control module further comprises a memory store having a yaw control scheme stored therein.

12. The system of claim 11, wherein the wind turbine distributed control system further comprises one or more interlocks configured to protect the distributed control module.

13. The system of claim 9, wherein the yaw drive mechanism comprises a yaw drive motor, a yaw drive pinion, and a yaw bearing operatively coupled with the yaw drive pinion, the yaw bearing configured between the nacelle and a tower of the wind turbine.

14. The system of claim 13, wherein the yaw drive mechanism further comprises a yaw drive gearbox operatively coupled to the yaw drive motor and the yaw drive pinion, and wherein the yaw drive pinion is in rotational engagement with the yaw bearing.

15. The system of claim 14, wherein controlling the yaw drive mechanism based on the control signal further comprises sending the control signal to the yaw drive motor such that the yaw drive motor imparts mechanical force to the yaw drive gearbox and the yaw drive gearbox drives the yaw drive pinion so as to rotate the yaw bearing and consequently, the nacelle about a yaw axis.

16. The system of claim 9, wherein the wind sensor further comprises at least one of a Light Detection and Ranging (LIDAR) device, a Sonic Detection and Ranging (SODAR) device, an anemometer, a wind vane, a barometer, or a radar device.

* * * * *